(12) United States Patent
Hasegawa

(10) Patent No.: US 7,251,968 B2
(45) Date of Patent: Aug. 7, 2007

(54) STEERING LOCK

(75) Inventor: Hiroyasu Hasegawa, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 29 days.

(21) Appl. No.: 11/190,538

(22) Filed: Jul. 27, 2005

(65) Prior Publication Data

US 2006/0022523 A1 Feb. 2, 2006

(30) Foreign Application Priority Data

Jul. 29, 2004 (JP) ............................. 2004-221403

(51) Int. Cl.
*B60R 25/02* (2006.01)
(52) U.S. Cl. ......................................... 70/186; 70/252
(58) Field of Classification Search .......... 70/182–186, 70/252
See application file for complete search history.

(56) References Cited

U.S. PATENT DOCUMENTS 6,354,118 B1 * 3/2002 Frick et al. .................... 70/186
6,931,896 B2 * 8/2005 Ochi ........................... 70/186
2003/0071520 A1 4/2003 Hayashi et al. ............. 307/10.3
2003/0115917 A1* 6/2003 Rudolph et al. ............... 70/252
2005/0183476 A1* 8/2005 Feucht et al. .................. 70/186

FOREIGN PATENT DOCUMENTS

| EP | 1 359 069 A1 | 11/2003 |
| JP | 2002-283964 | * 3/2002 |
| JP | 2003-63354 | 3/2003 |
| JP | 2003-063354 | 3/2003 |

* cited by examiner

*Primary Examiner*—Brian E. Glessner
*Assistant Examiner*—Kristina R Gluchowski
(74) *Attorney, Agent, or Firm*—Marsh Fischmann & Breyfogle LLP

(57) ABSTRACT

A steering lock that is easy to assemble includes an ECU case having a first terminal. The first terminal has an end for directly contacting an input terminal of a motor. A component for connecting the first terminal of the ECU case and the input terminal of the motor is not necessary. The other end of the first terminal is directly connected to an electric circuit of a steering lock ECU. This eliminates the need for an additional component connecting the first terminal and the steering lock ECU.

12 Claims, 7 Drawing Sheets

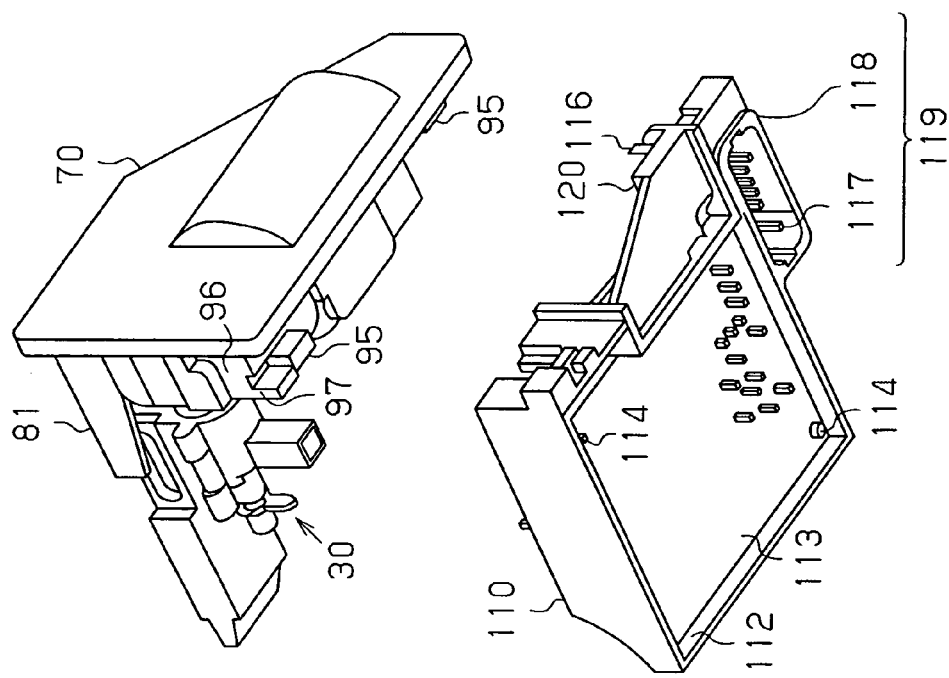
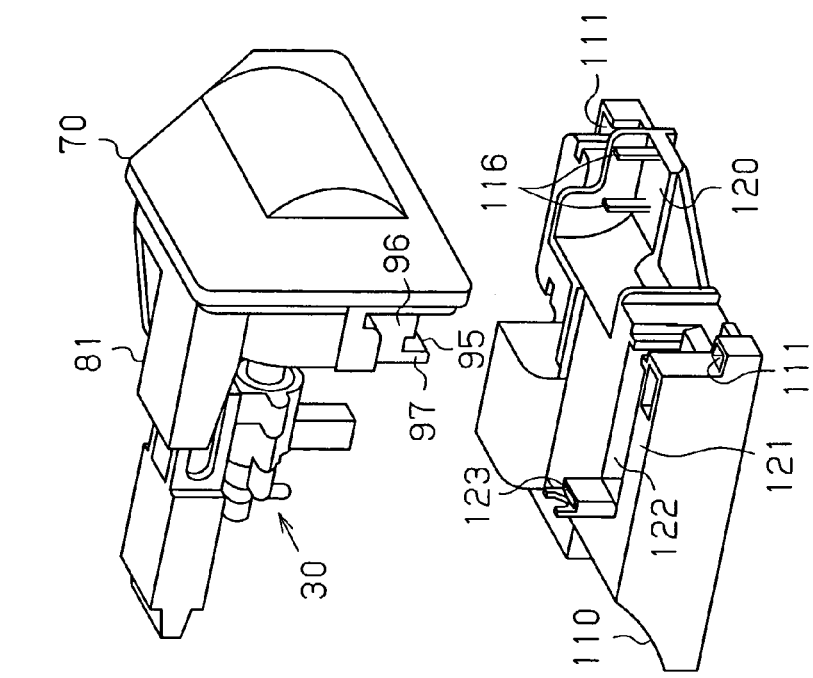

7,251,968 B2

STEERING LOCK

CROSS-REFERENCE TO RELATED APPLICATIONS

This application is based upon and claims the benefit of priority from prior Japanese Patent Application No. 2004-221403, filed on Jul. 29, 2004, the entire contents of which are incorporated herein by reference.

BACKGROUND OF THE INVENTION

The present invention relates to a steering lock for engaging a lock bar with a steering shaft to disable steering.

Japanese Laid-Open Patent Publication No. 2003-063354, describes a conventional electric steering lock. The conventional electric steering lock includes an actuator such as a motor that is electrically activated when a mechanical key, which is inserted in a key cylinder, is turned. A steering shaft is locked by a lock bar driven by the actuator.

The steering lock includes a housing and a bracket, which are attached to a sleeve covering the steering shaft. The sleeve is held between the housing and the bracket. A bolt fastens the housing and the bracket to fix the housing to the sleeve.

The housing houses various internal components. The internal components include the lock bar, which is movable for engagement with the steering shaft, a motor for driving the lock bar, a transmission mechanism for transmitting the drive force of the motor to the lock bar, a steering lock electronic control unit (ECU) for controlling the motor, and lock and unlock switches for detecting whether the lock bar is engaged with the steering shaft.

Each internal component is inserted in the housing from an opening of the housing and arranged at a predetermined position in the housing. A cover is attached to the housing to close the opening. The steering lock disables steering to prevent theft of an automobile provided with the steering lock.

The steering lock does not incorporate a power supply for activating electric components, such as the motor and the steering lock ECU. The steering lock includes an external connector connected to an external power supply to supply the electric components with power. The external connector is also used to communicate signals between the steering lock ECU and a vehicle ECU, which functions as a vehicle controller.

The external connector includes a terminal connected to the steering lock ECU. The terminal is electrically connected to a cable, which is further connected to a vehicle power supply and the vehicle ECU. The steering ECU includes a conductive pattern electrically connected to the terminal and a motor connector electrically connected to the conductive pattern. The motor connector is electrically connected to an input terminal of the motor via a lead wire. Power is supplied from a car battery to the input terminal of the motor via the cable, the terminal, the conductive pattern, the motor connector, and the lead wire.

However, in the conventional steering lock, it is difficult to electrically connect the motor and the vehicle power supply. Especially, soldering of the lead wire to the input terminal of the motor and fitting of the lead wire in the motor connector are operations requiring effort and time. This reduces assembly efficiency of the steering lock.

SUMMARY OF THE INVENTION

It is an object of the present invention to provide a steering lock that is easy to assemble.

One aspect of the present invention is a steering lock for selectively disabling steering by engaging a steering shaft of a vehicle. The steering lock includes a lock bar for disabling rotation of the steering shaft when engaged with the steering shaft. A drive source drives the lock bar. The drive source includes an input terminal. A circuit board includes an electric circuit for controlling the drive source. A case accommodates the circuit board. A first terminal is formed integrally with the case and directly connected to the input terminal of the drive source.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 5A and 5B are exploded perspective views both showing an ECU case and a cover;

DETAILED DESCRIPTION OF THE PREFERRED EMBODIMENTS

Figure 1:
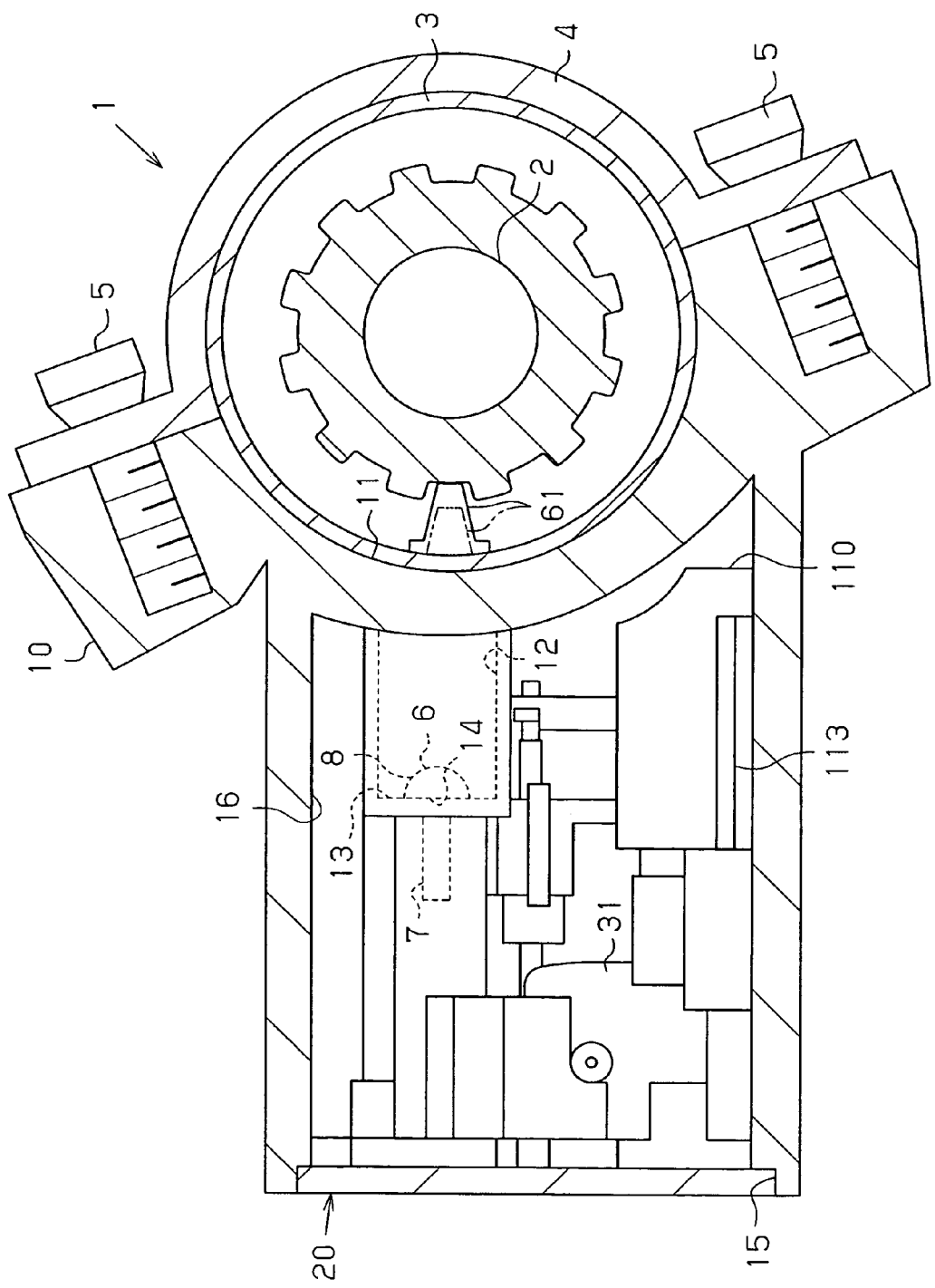
FIG. 1 is a cross-sectional view showing a steering lock according to a preferred embodiment of the present invention.

An electric steering lock 1 for use in vehicles according to a preferred embodiment of the present invention will now be described with reference to FIGS. 1 to 8.

The steering lock 1 uses drive force of a motor 31 to engage a lock bar 61 with a steering shaft 2 and disable steering.

The steering lock 1 includes a magnesium die-cast housing 10 and a lock unit 20 incorporated in the housing 10. A sleeve 3, which receives and supports the steering shaft 2, is held between the housing 10 and a bracket 4, which are fastened to each other by bolts 5.

The housing 10 has an arcuate mounting surface 11 extending along the outer surface of the sleeve 3. The housing 10 has a receptacle 12, which opens in the mounting surface 11. A bolt hole 14 is formed in the bottom 13 of the receptacle 12 to receive the bolt 6, which functions as a first fastener. The bolt 6 includes a male-thread shaft 7, which functions as a fastening portion, and a head 8, which is arranged on one end of the shaft 7. The head 8 has a diameter that is greater than the diameter of the bolt hole 14. The head 8 of the bolt 6 is engaged with the bottom 13 of the receptacle 12.

An accommodation chamber 16 is defined in the housing 10. The accommodation chamber 16 has an opening 15 located opposite to the mounting surface 11. A lock unit 20 is inserted in the accommodation chamber 16 through the opening 15 and attached to the housing 10.

Figure 2:
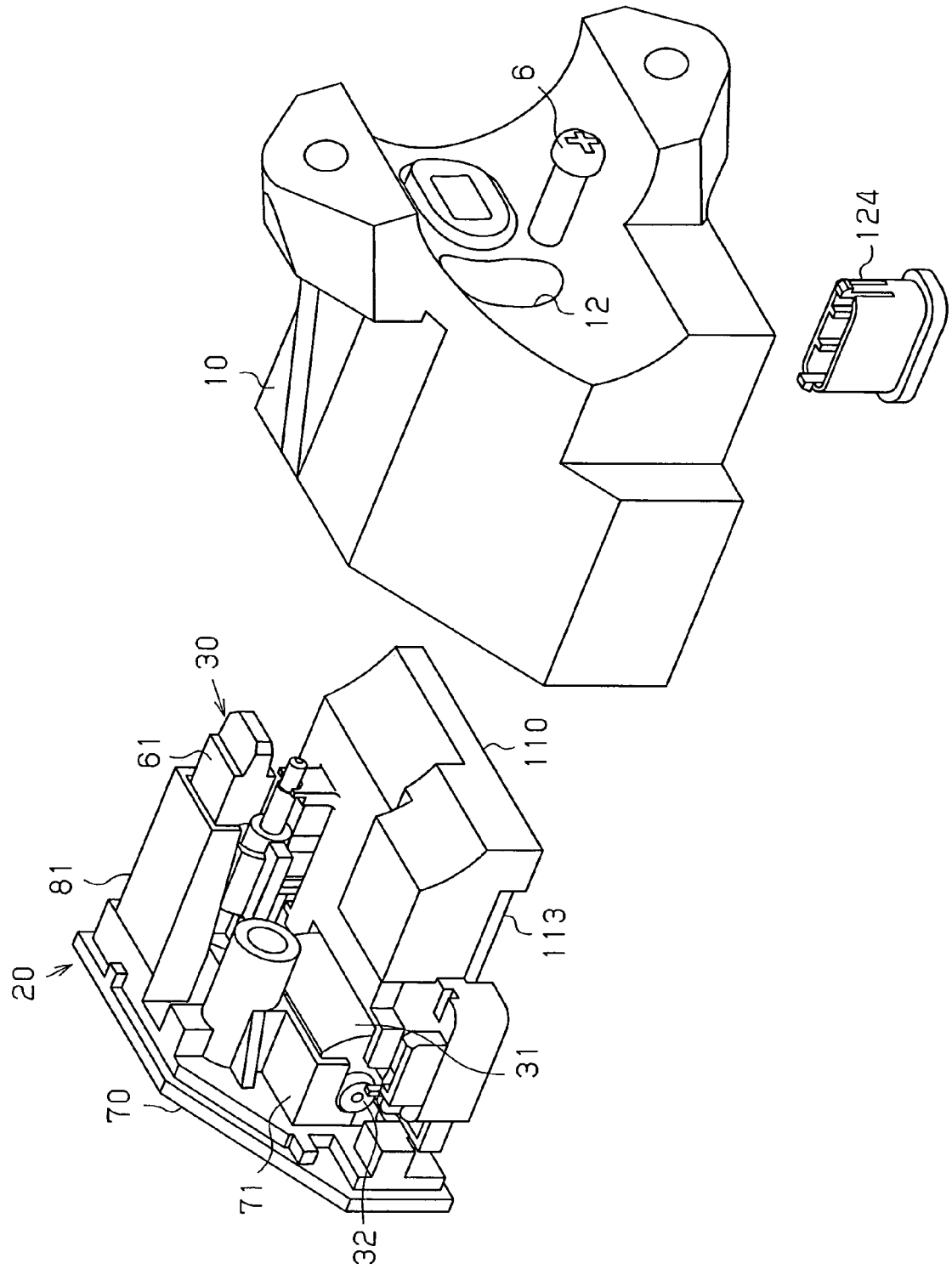
FIG. 2 is an exploded perspective view showing a lock unit and a housing of the steering lock shown in FIG. 1.

As shown in FIG. 2, the lock unit 20 includes a lock mechanism 30, a magnesium die-cast cover 70, and a resin ECU case 110. The lock mechanism 30 is supported by cooperation between the cover 70 and the ECU case 110. The lock mechanism 30 includes a motor 31, a transmission mechanism 41, and a lock bar 61 (see FIG. 6). The motor 31 functions as a drive source for moving the lock bar 61 relative to the steering shaft 2. The transmission mechanism 41 transmits drive force of the motor 31 to the lock bar 61. The cover 70 closes the opening 15 of the housing 10. The housing 10 has an end surface defining the opening 15. The end surface of the housing 10 is flush with the outer surface of the cover 70.

Figure 3A:
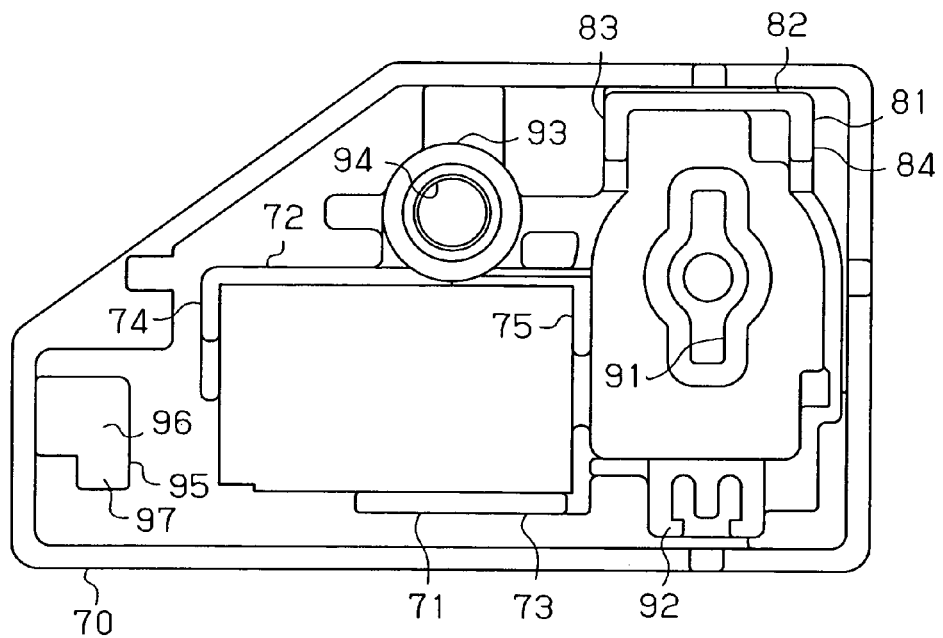
FIG. 3A is a plan view and FIG. 3B is a perspective view showing a cover of the steering lock shown in FIG. 1.
Figure 3B:
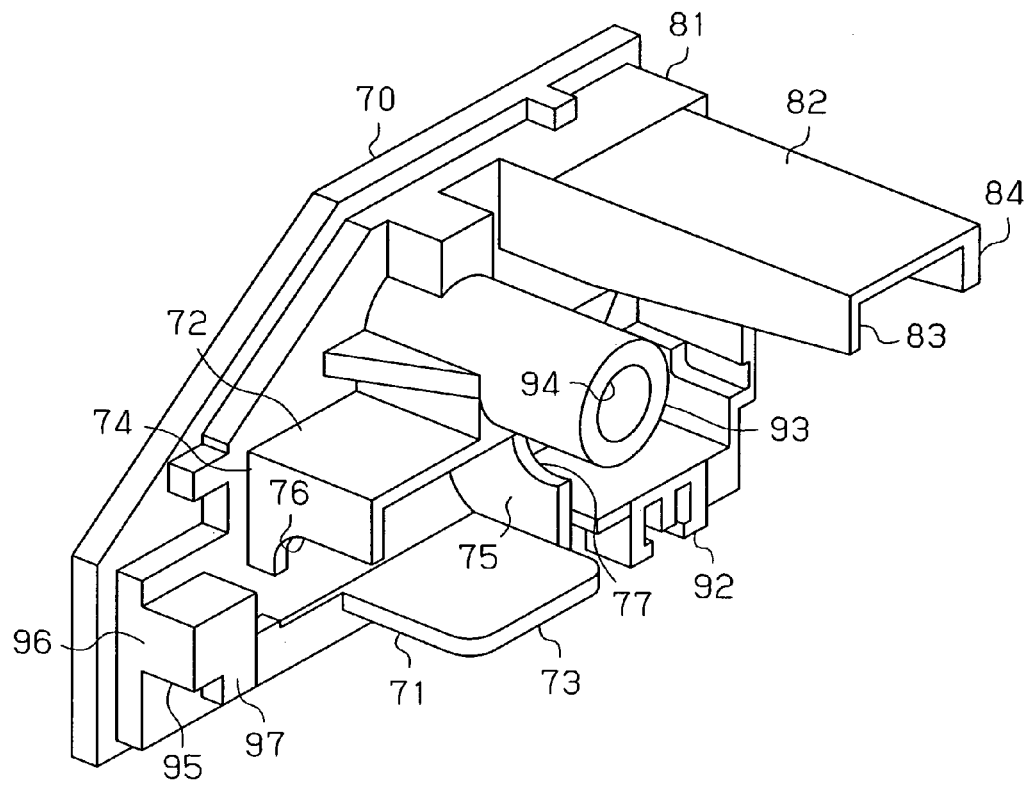

As shown in FIG. 3B, in addition to the outer surface, the cover 70 has an inner surface, which faces the accommodation chamber 16 and which is opposite the outer surface. A first drive source support 71 is formed integrally with the inner surface of the cover 70 such that the first drive source support 71 extends orthogonally to the inner surface to hold the motor 31. The first drive source support 71 may be a rectangular frame having an upper wall 72 engaging with an upper portion of the motor 31, a lower wall 73 engaging with a lower portion of the motor 31, a first side wall 74 engaging with a basal end of the motor 31, and a second side wall 75 engaging with a distal end of the motor 31. The first side wall 74 has an arcuate surface 76 for supporting a bearing 32 of the motor 31 (see FIG. 2). The second side wall 75 has a similar arcuate surface 77. Part of the motor 31 may be engaged with the inner surface of the cover 70. The motor 31 is mainly held by the first drive source support 71, which is integral with the cover 70. The motor 31 is not directly fixed to the housing 10.

A U-shaped support frame 81 is formed integrally with the cover 70 near the first drive source support 71 so as to extend orthogonally relative to the inner surface of the cover 70. The support frame 81 has an upper wall 82 engaging with the top of the transmission mechanism 41, a first side wall 83 engaging with one side of the transmission mechanism 41, and a second side wall 84 engaging with the other side of the transmission mechanism 41 and the lock bar 61.

A bushing support 91 is formed on the inner surface of the cover 70 near the support frame 81. The bushing support 91 supports a first bushing 35 included in the transmission mechanism 41 (see FIG. 6). An M-shaped leaf spring support 92 is formed near the bushing support 91. The leaf spring support 92 supports a leaf spring 48 included in the transmission mechanism 41 (see FIG. 6). The support frame 81, the bushing support 91, and the leaf spring support 92 form a first transmission mechanism support structure. The transmission mechanism 41 is mainly held by the first transmission mechanism support structure and is not directly fixed to the housing 10.

A protrusion 93, which functions as a second fastener, is formed integrally with the inner surface of the cover 70. The protrusion 93 is a cylinder having a female thread 94. The protrusion 93 has an open end surface that abuts against the bottom 13 of the receptacle 12 of the housing 10. The cover 70 (lock unit 20) is fixed to the housing 10 by inserting the bolt 6 in the bolt hole 14 of the receptacle 12 and engaging the bolt 6 with the female thread 94.

Figure 6:
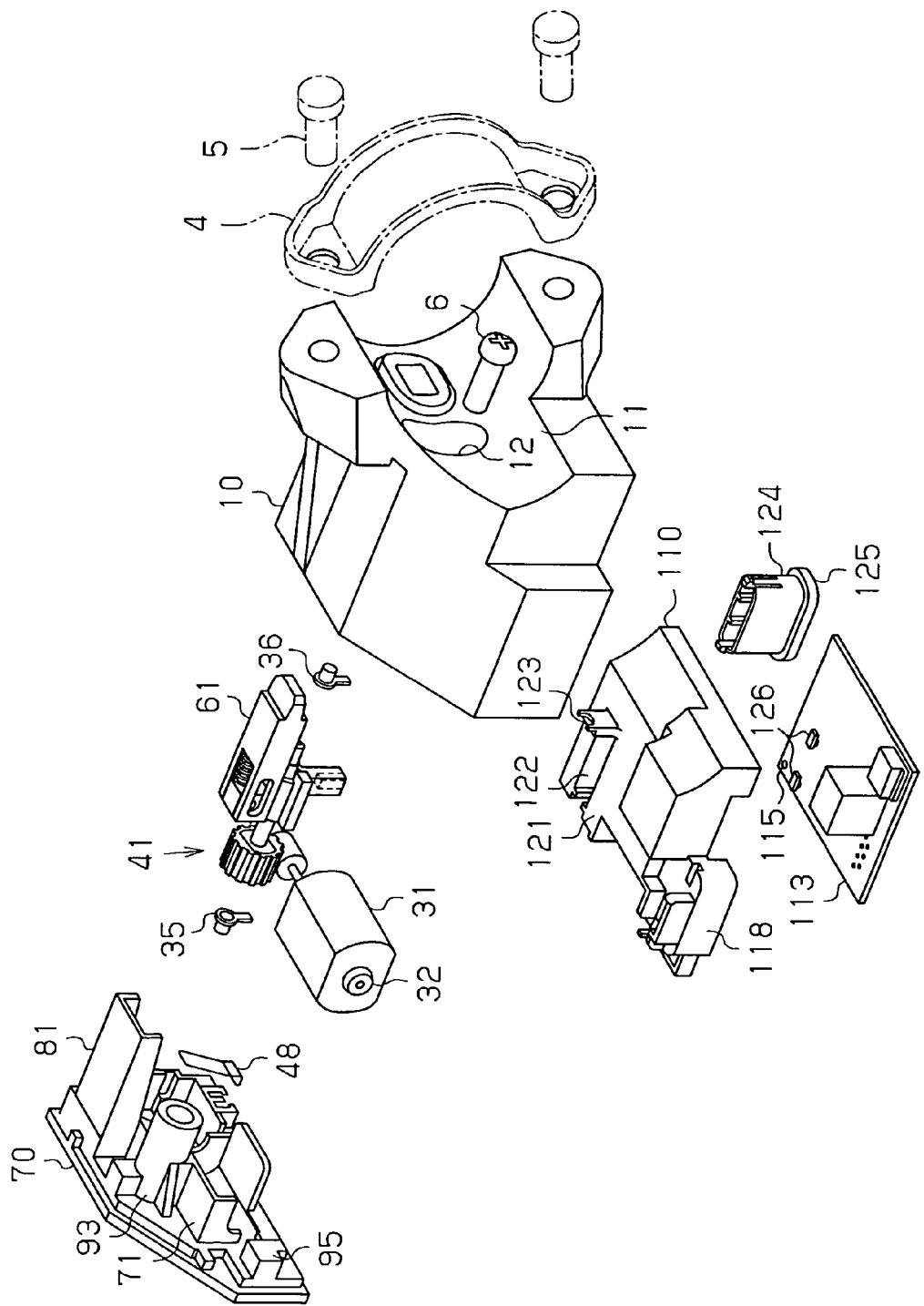
FIG. 6 is an exploded perspective view showing the steering lock of FIG. 1.

An L-shaped pawl 95 is formed on a lower portion of the cover 70, as viewed in FIGS. 5A, 5B, and 6. The pawl 95 has a basal end 96 and a distal end 97 extending downwards from the basal end 96. The distal end 97 of the pawl 95 engages with a notch 111 formed in the ECU case 110. The engagement between the pawl 95 and the notch 111 positions the cover 70 with respect to the ECU case 110 and prevents the ECU case 110 from moving relative to the cover 70. For example, the ECU case 110 is prevented from moving in the lateral direction along the cover 70.

An accommodation compartment 112 is formed in the rear surface of the ECU case 110. A steering lock ECU 113, which includes a circuit board having a control circuit for controlling the motor 31, is arranged in the accommodation compartment 112. A plurality of cylindrical projections 114 are provided in the accommodation compartment 112. The cylindrical projections 114 are thermally caulked into and received by round holes 115 formed in the steering lock ECU 113. This fixes the steering lock ECU 113 to the ECU case 110. Accordingly, the steering lock ECU 113 is supported only by the ECU case 110. The ECU case 110 entirely covers one surface of the steering lock ECU 113 (the surface on which the control circuit and other electronic components are arranged). Thus, foreign material such as metallic powder is prevented from collecting in the steering lock ECU 113.

Figure 7:
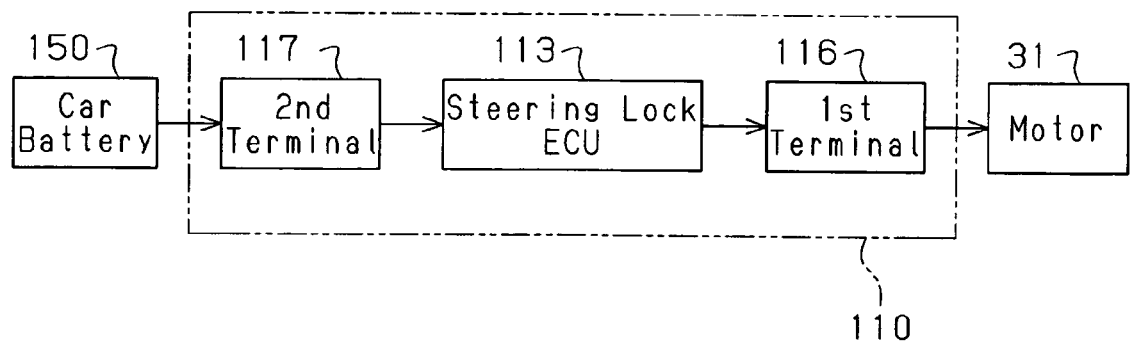
FIG. 7 is a block diagram showing a motor controller.

As shown in FIGS. 5A and 5B, the ECU case 110 has a first terminal 116 and a second terminal 117, which are insert-molded. The first terminal 116 and the second terminal 117 can be partially embedded in the ECU case. The first terminal 116 is an internal terminal including a distal end directly connected to the input terminal of the motor 31 and a basal end directly connected to the steering lock ECU 113. The second terminal 117 is an external terminal for receiving power from a car battery 150 (see FIG. 7) located outside the housing 10. As shown in FIG. 7, the steering lock ECU 113 is connected between the first terminal 116 and the second terminal 117. The steering lock ECU 113 includes a drive circuit, which drives the motor 31 with the power supplied to the second terminal 117.

The distal end of first terminal 116 extends from the inner surface of the ECU case 110. The distal end of the first terminal 116 functions as a brush, which elastically contacts the input terminal of the motor 31. When the ECU case 110 is connected to the cover 70 to which the motor 31 is attached, the distal end of the first terminal 116 is electrically connected to the input terminal of the motor 31. The basal end of the first terminal 116 is arranged in the accommodation compartment 112 and electrically connected to the steering lock ECU 113.

The distal end of the second terminal 117 is arranged in a terminal socket 118, which is defined in the rear surface of the ECU case 110. The basal end of the second terminal 117 is arranged in the accommodation compartment 112 and electrically connected to the steering lock ECU 113.

The distal end of the second terminal 117 and the terminal socket 118 form a first connector 119. The first connector 119 is housed in the housing 10 (see FIG. 4).

The ECU case 110 includes a second drive source support, which cooperates with the first drive source support 71 of the cover 70 to fasten the motor 31. The second drive source support is formed around the first terminal 116 and includes a support surface 120 supporting the lower portion of the motor 31. The first drive source support and the second drive source support form a drive source holder.

The ECU case 110 includes a second transmission mechanism support structure 121, which supports the transmission mechanism 41 with the first transmission mechanism support structure of the cover 70. The second transmission mechanism support structure 121 includes a groove 122, which engages part of the transmission mechanism 41, and a second bushing support 123, which supports a second bushing 36 (see FIG. 6) attached to the transmission mechanism 41. The second transmission mechanism support structure 121 cooperates with the first transmission mechanism support structure of the cover 70 to hold the transmission mechanism 41. The first transmission mechanism support structure and the second transmission mechanism support structure form a transmission mechanism holder.

Figure 4:
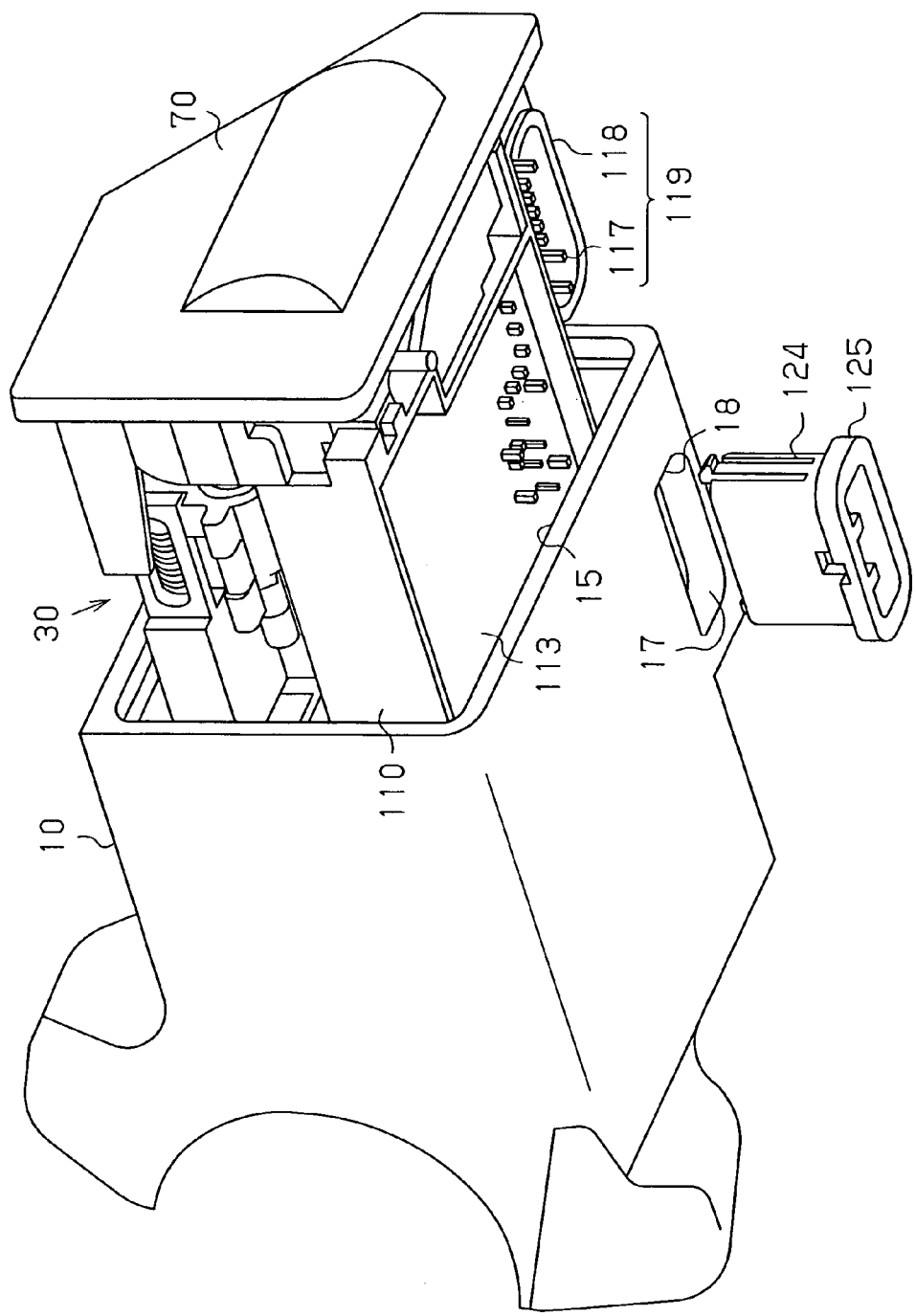
FIG. 4 is an exploded perspective view showing the lock unit, a second connector, and the housing.

As shown in FIG. 4, the housing 10 includes an external wall 18 having a through hole 17. The through hole 17 is spaced from the opening 15 and is not formed continuously from the opening 15. The through hole 17 receives a tubular second connector 124. The second connector 124 includes a hollow body and a flange 125. The second connector 124 has a distal end housed in the terminal socket 118 of the ECU case 110 and engaged with the first connector 119. When the second connector 124 is coupled to the first connector 119, the flange 125 (basal end) of the second connector 124 protrudes from the outer surface of the housing 10. The second connector 124 is connected to a cable for supplying power from a car battery 150, which functions as an energy source, to the motor 31

The engagement between the second connector 124 inserted in the through hole 17 and the external wall 18 of the housing 10 prevents the lock unit 20 (steering lock ECU 113) from falling out of the housing 10. The external wall 18, in which the through hole 17 is formed, and the second connector 124 function as a restriction structure for preventing internal components from falling out of the housing. The restriction structure restricts movement of the steering lock ECU 113 (circuit board).

The first connector 119 and the second connector 124 function as signal connectors, each of which functions as a power supply terminal for supplying the power of the car battery 150 to the motor 31 and the steering lock ECU 113 and as an interface between the steering lock ECU 113 and the vehicle ECU.

Figure 8:
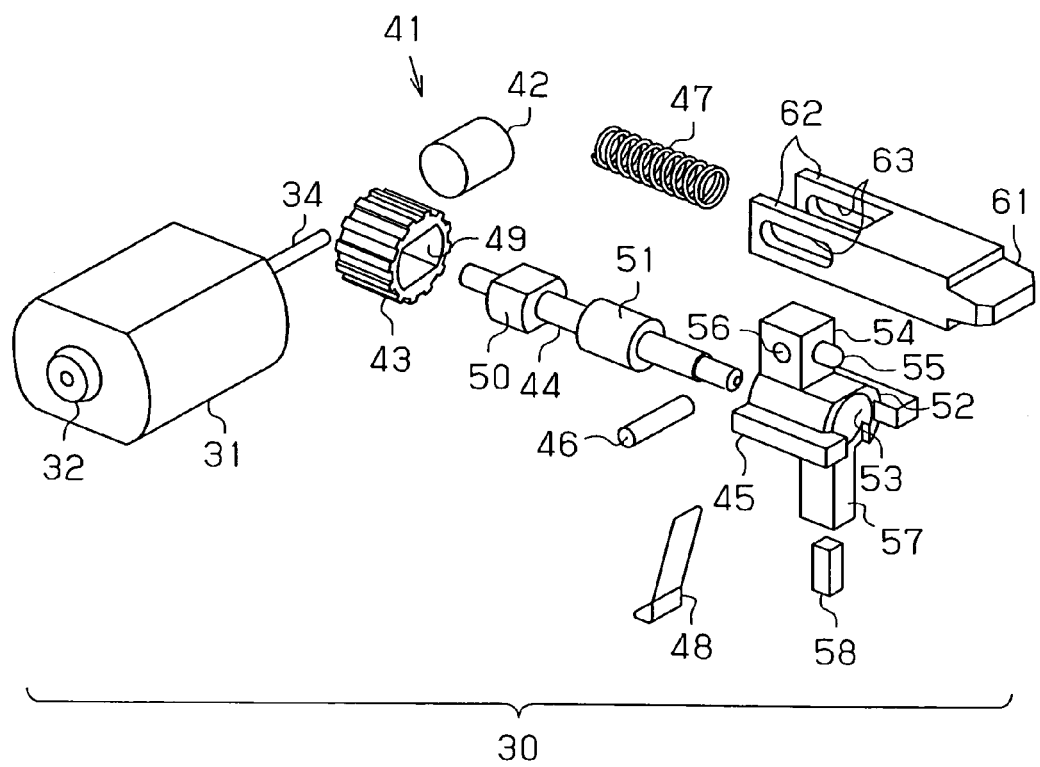
FIG. 8 is an exploded perspective view showing the lock mechanism.

As shown in FIG. 6, the transmission mechanism 41 is arranged between the motor 31 and the lock bar 61. As shown in FIG. 8, the transmission mechanism 41 includes a worm gear 42, a helical gear 43, a rotary shaft 44, a lock bar carrier 45, a pin 46, a spring 47, and a leaf spring 48. The worm gear 42 is fixed to an output shaft 34 of the motor 31. The worm gear 42 is meshed with the helical gear 43. The helical gear 43 has an insertion hole 49 to receive and support an expanded portion 50 of the rotary shaft 44. The helical gear 43 and the rotary shaft 44 are rotated by the motor 31.

The rotary shaft 44 has a male-thread portion 51. The lock bar carrier 45 includes a cylindrical body 52 having a female-thread portion 53. The male-thread portion 51 of the rotary shaft 44 is engaged with the female-thread portion 53 of the lock bar carrier 45. An example of the female-thread portion 53 is a trapezoidal double-threaded screw. The engagement between the female-thread portion 53 and the male-thread portion 51 converts the rotation of the rotary shaft 44 to linear motion of the lock bar carrier 45. The lock bar carrier 45 is movable within the range the female-thread portion 53 is engaged with the male-thread portion 51.

A support column 54 for supporting the lock bar 61 is formed on the cylindrical body 52 of the lock bar carrier 45. The support column 54 includes a spring seat 55. The spring 47 is arranged on the spring seat 55. The support column 54 includes a pin hole 56 which extends orthogonally relative to the spring seat 55. The lock bar carrier 45 includes two elongated stopper projections, which linearly extend on the outer surface of the cylindrical body 52 and along the axis of the cylindrical body 52 (i.e., moving direction of the lock bar 61).

The lock bar 61 has two side plates 62. The support column 54 is arranged between the two side plates 62. The spring 47 is elastically held between the lock bar 61 and the spring seat 55 of the support column 54. The spring 47 urges the lock bar 61 toward the steering shaft 2. An elongated hole 63 extends through each of the side plates 62 of the lock bar 61. The pin 46 is received in and supported by the elongated holes 63 and the pin hole 56 of the support column 54. When compressive force of the spring 47 is applied to the lock bar 61, the pin 46 moves relative to the elongated holes 63. This absorbs the compressive force. The distance of the elastic movement of the lock bar 61 is restricted by the length of the elongated holes 63.

The lock bar 61 moves linearly integrally with the lock bar carrier 45 when the motor 31 is activated. Abutment or engagement between the stopper projections of the lock bar carrier 45 and the support frame 81 of the cover 70 prevents the lock bar carrier 45 from being rotated by the rotary shaft 44. The support frame 81 of the cover 70 enables only linear movement of the lock bar carrier 45 and restricts rotation of the lock bar 61. The stopper projections of the lock bar carrier 45 function as part of a structure for restricting rotation of the lock bar carrier 45. The support frame 81 of the cover also functions as part of a structure for restricting rotation of the lock bar carrier 45 and as a guide piece for guiding movement of the lock bar carrier 45.

A magnet holder 57 is formed under the cylindrical body 52. The magnet holder 57 holds a magnet 58. The magnet holder 57 is received in the groove 122 of the ECU case 110. The magnet holder 57 and the magnet 58 move along the groove 122 when the motor 31 is driven.

In the ECU case 110, two Hall ICs 126 are located directly below the groove 122 to detect the position of the magnet 58. The Hall ICs 126 may be connected to the steering lock ECU 113. The Hall ICs 126 may be arranged, for example, such that one of the Hall ICs 126 detects the magnet 58 when the lock bar 61 is located at the lock position, and the other Hall IC 126 detects the magnet 58 when the lock bar 61 is located at the unlock position. The ECU 113 determines, based on detection signals from the Hall ICs 126, whether the lock bar 61 is located at the lock position or at the unlock position. Steering is disabled when the lock bar 61 is located at the lock position. Steering is enabled when the lock bar 61 is located at the unlock position.

The lock bar carrier 45 is a single member integrally formed from the cylindrical body 52, the support column 54, the structure for converting rotation produced by the motor 31 to linear motion of the lock bar 61 (female-thread portion 53), and the magnet holder 57 holding the magnet 58 for detecting the position of the lock bar 61.

The first bushing 35 and the second bushing 36 are arranged on opposite ends of the rotary shaft 44. The leaf spring 48 urges the lock bar carrier 45 towards the mounting surface 11 of the housing 10. Due to this urging, even if the female-thread portion 53 of the lock bar carrier 45 and the male-thread portion 51 of the rotary shaft 44 are disengaged from each other, the engagement between the female-thread portion 53 and the male-thread portion 51 is immediately restored.

Operation of the steering lock 1 of the preferred embodiment will now be described.

When the steering shaft 2 is engaged with the lock bar 61 (as indicated by the state shown by the solid lines in FIG. 1), the steering lock 1 is in a lock state. If the engine is started when the steering lock 1 is locked, the steering lock ECU 113 produces rotation in a first direction with the motor 31. Thus, the motor 31 rotates the worm gear 42, the helical gear 43, and the rotary shaft 44. The engagement between the female-thread portion 53 of the lock bar carrier 45 and the male-thread portion 51 of the rotary shaft 44 moves the lock bar carrier 45 and the lock bar 61 away from the steering shaft 2. When the Hall ICs 126 detect an unlock state based on the position of the magnet 58, the steering lock ECU 113 stops the motor 31. As a result, the lock bar 61 shifts to the unlock state in which steering is enabled (as indicated by the state shown by the broken lines in FIG. 1).

When the engine is stopped with the steering lock 1 in the unlock state and a vehicle occupant opens and closes the vehicle door to leave the vehicle, the steering lock ECU 113 produces rotation with the motor 31 in a second direction. The motor 31 rotates the worm gear 42, the helical gear 43 and the rotary shaft 44. The engagement between the female-thread portion 53 of the lock bar carrier 45 and the male-thread portion 51 of the rotary shaft 44 moves the lock bar carrier 45 and the lock bar 61 towards the steering shaft 2. When the Hall Ics 126 detect the lock state based on the position of the magnet 58, the steering lock 1 ECU 113 stops the motor 31. As a result, lock bar 61 shifts to the lock state in which steering is disabled (as indicated by the state shown by the solid lines in FIG. 1).

The procedures for assembling the steering lock 1 of the preferred embodiment will now be described.

The lock mechanism 30 (the motor 31, the transmission mechanism 41, and the lock bar 61) is attached to the cover 70 to assemble a first subunit. The steering lock ECU 113 is attached to the ECU case 110 to assemble a second subunit. The first subunit is then attached to the second subunit to assemble the lock unit 20. The lock unit 20 is attached to the housing 10. The second connector 124 is then fitted in the first connector 119.

The steering lock 1 of the preferred embodiment has the advantages described below.

(1) The first drive source support 71 and first transmission mechanism support structure formed on the cover 70 support the lock mechanism 30 (the motor 31, the transmission mechanism 41, and the lock bar 61). This forms a unit including the cover 70 and the lock mechanism 30 before the cover 70 is attached to the housing 10. The lock mechanism 30 is accommodated in the accommodation chamber 16 of the housing 10 by closing the opening 15 of the housing 10 with the cover 70. Thus, assembly operations do not have to be performed in the accommodation chamber 16 of the housing 10. This improves assembling efficiency of the steering lock 1.

(2) The cover 70 and the ECU case 110 cooperate with each other to stably hold the lock mechanism 30 (the motor 31, the transmission mechanism 41, and the lock bar 61). Therefore, the lock unit 20 including the cover 70, the ECU case 110, and the lock mechanism 30 is formed before the cover 70 is attached to the housing 10. The arrangement of the lock mechanism 30 at the predetermined position in the accommodation chamber 16 of the housing 10 is ensured by attaching the lock unit 20 to the housing 10. This improves assembling efficiency of the steering lock 1.

(3) The steering lock ECU 113 is accommodated in the accommodation compartment 112 of the ECU case 110 and supported by the ECU case 110. The ECU 113 is not supported by the cover 70. The lock mechanism 30 is also supported by the ECU case 110. Therefore, structures for holding the lock mechanism 30 are not concentrated on the cover 70. Further, the assembling of the first subunit with the cover 70 and the lock mechanism 30 is facilitated. This improves assembling efficiency of the steering lock 1.

(4) The second connector 124 inserted in the through hole 17 of the housing 10 is connected to the first connector 119 to form an external connector. Thus, the external connector is divided into a first connector 119 and a second connector 124. Therefore, the housing 10 and the ECU case 110 may be designed such that the first connector 119 does not interfere with the attachment of the lock unit 20 to the housing 10. Such designing is easier than when forming a single external connector in the housing 10 or the ECU case 110.

The through hole 17 is spaced from the opening 15. That is, the end surface of the housing 10 defining the opening does not have a cutaway section that extends continuously to the through hole 17. This prevents the housing 10 from cracking when the housing 10 deforms and causes stress to concentrate at part of the end surface of the housing 10 defining the opening 15. This enables the housing 10 to have higher strength in comparison to the housing of the prior art which includes a cutaway section extending from the opening 15 (not shown). Further, the housing 10 does not have to house the entire second connector 124. Thus, the housing 10 is relatively compact.

(5) The flange 125 of the second connector 124 is exposed from the external wall 18 of the housing 10. This facilitates connection of a cable to the second connector 124.

(6) The engagement of the second connector 124 with the external wall 18 of the housing 10 and part of the lock unit 20 prevents the lock unit 20 from falling out of the housing 10. Additionally, it is difficult for a third party to notice that the second connector 124 forms part of the structure that attaches the housing 10 and the lock unit 20. Therefore, it is difficult for a thief to dismantle the steering lock 1 when attempting to steal the vehicle. Thus, the steering lock 1 has a high theft proof effect.

(7) The first terminal 116 of the ECU case 110 is directly connected to the input terminal of the motor 31. This eliminates the need for an additional component connecting the first terminal 116 and the input terminal and facilitates the attachment of the motor 31. Thus, assembling efficiency of the steering lock 1 is improved.

(8) The first terminal 116 of the ECU case 110 is directly connected to the steering lock ECU 113. This eliminates the need for an additional component connecting the first terminal 116 and the steering lock ECU 113 and facilitates the attachment of the ECU case 110. Thus, assembling efficiency of the steering lock 1 is improved.

(9) The second terminal 117 of the ECU case 110 is directly connected to the steering lock ECU 113. This eliminates the need for an additional component connecting the second terminal 117 and the steering lock ECU 113 and facilitates the attachment of the ECU case 110. Thus, assembling efficiency of the steering lock 1 is improved.

(10) The lock bar carrier 45 is a single member which is integrally formed from the cylindrical body 52 and the support column 54. Hence, there is no need for attaching the cylindrical body 52 and the support column 54 to each other. This improves assembling efficiency of the steering lock 1.

(11) The lock bar carrier 45 is a single member formed from a structure for converting rotation of the motor 31 to linear motion of the lock bar 61 (female-thread portion 53). Therefore, there is no need for assembling such a structure. Thus, assembling efficiency of the steering lock 1 is improved.

(12) When the motor 31 is activated, the lock bar carrier 45 supporting the lock bar 61 is moved in a state guided by the support frame 81 of the cover 70. This ensures that the lock bar 61 is engaged with the steering shaft 2.

(13) The lock bar carrier 45 is a single member integrally formed from the magnet holder 57, which holds the magnet 58 for determining the position of the lock bar 61. This eliminates the need for attaching the magnet holder 57 to the lock bar carrier 45. Thus, assembling efficiency of the steering lock 1 is improved.

(14) The ECU case 110 is a single member with which the terminal socket 118 is integrally formed. Thus, there is no need to attach the terminal socket 118 to the ECU case 110. This decreases the number of components of the steering lock 1 and improves assembling efficiency of the steering lock 1.

(15) The ECU case 110 includes the accommodation compartment 112, which partitions the steering lock ECU 113 and the lock mechanism 30 to protect the steering lock ECU 113. Due to the accommodation compartment 112, the steering lock ECU 113 is not exposed to the lock mechanism 30. This prevents foreign material, such as metallic powder produced during operation of the lock mechanism 30, from collecting on the electric circuit (control circuit) of the steering lock ECU 113. Further, when the ECU case 110 is inserted in the housing 10, the external wall 18 of the housing 10 covers the opening of the accommodation compartment 112. This prevents foreign material from collecting on the steering lock ECU 113.

It should be apparent to those skilled in the art that the present invention may be embodied in many other specific forms without departing from the spirit or scope of the invention. Particularly, it should be understood that the present invention may be embodied in the following forms.

The steering lock ECU 113 need not necessarily be fixed directly to the housing 10 and may be supported by a support which is provided integrally with the cover 70.

The position of the through hole 17 in the external wall 18 of the housing 10 may be changed in accordance with the position of the first connector 119. The through hole 17 is preferably formed at a position spaced from the end surface of the housing 10 defining the opening 15 where deformation occurs relatively easily.

The external connector is not limited to a first connector 119 and a second connector 124. Three or more connectors may be used as the external connector.

The quantity of the first terminal 116 may be changed in accordance with the number of the input terminals of the motor 31.

The quantity of the second terminal 117 may be changed in accordance with the number of signals required for communication between the steering lock ECU 113 and the on-vehicle ECU.

The drive source is not limited to the motor 31 and may be any type of actuator.

The distal end of the lock bar 61 may include a recess and the steering shaft 2 may include a projection so that the recess of the lock bar 61 is engaged with the projection of the steering shaft 2.

The present examples and embodiments are to be considered as illustrative and not restrictive, and the invention is not to be limited to the details given herein, but may be modified within the scope and equivalence of the appended claims.

What is claimed is:

1. A steering lock for selectively disabling steering by engaging a steering shaft of a vehicle, the steering lock comprising:
    a lock bar for disabling rotation of the steering shaft when engaged with the steering shaft;
    a drive source for driving the lock bar, the drive source including an input terminal;
    a circuit board including an electric circuit for controlling the drive source;
    a case for accommodating the circuit board;
    a first terminal formed integrally with the case and directly connected to the input terminal of the drive source wherein the first terminal includes a first end directly connected to the input terminal of the drive source and a second end directly connected to the electric circuit of the circuit board;
    a housing defining an accommodation chamber for housing internal components including the lock bar, the drive source, the circuit board and the case, wherein the housing includes an opening through which the internal components are inserted in the accommodation chamber;
    a cover for closing the opening of the housing; and
    a second terminal formed integrally with the case and including a first end, electrically connected to a vehicle power supply in which the power supply is located outside the housing, and a second end, directly connected to the electric circuit of the circuit board, wherein the electric circuit selectively supplies power, which is received via the second terminal, to the drive source via the first terminal and wherein the housing includes a through hole for accessing the second terminal from outside the housing when the case is housed in the housing.

2. The steering lock according to claim 1, further comprising:
    a terminal socket, formed integrally with the case, for accommodating the second terminal.

3. The steering lock according to claim 1, wherein the case is attached to and supported by the cover.

4. The steering lock according to claim 3, wherein the case includes a support surface for supporting the drive source.

5. The steering lock according to claim 3, wherein the drive source is held by the cover and the support surface of the case when the case is attached to the cover.

6. The steering lock according to claim 1, wherein the lock bar and the drive source form a lock mechanism, and the case defines a compartment for accommodating the circuit board so that the circuit board is not exposed to the lock mechanism.

7. The steering lock according to claim 6, wherein the compartment of the case has an opening opposite to the lock mechanism, with the circuit board being inserted in the compartment of the case through the opening.

8. The steering lock according to claim 7, wherein the housing has an external wall partially covering the opening of the case when the case is housed in the housing.

9. The steering lock according to claim 1, wherein the first end of the first terminal is a brush for elastically contacting the input terminal of the drive source.

10. A steering lock for selectively disabling steering by engaging a steering shaft of a vehicle, the steering lock comprising:
    a lock bar for disabling rotation of the steering shaft when engaged with the steering shaft;

a drive source for driving the lock bar, the drive source including an input terminal;

a circuit board including an electric circuit for controlling the drive source;

a case for accommodating the circuit board;

a first terminal formed integrally with the case and directly connected to the input terminal of the drive source, wherein the first terminal includes a first end directly connected to the input terminal of the drive source and a second end directly connected to the electric circuit of the circuit board;

a housing defining an accommodation chamber for housing internal components including the lock bar, the drive source, the circuit board and the case, wherein the housing includes an opening through which the internal components are inserted in the accommodation chamber;

a cover for closing the opening of the housing; and a second terminal formed integrally with the case and including a first end, electrically connected to a vehicle power supply in which the power supply is located outside the housing, and a second end directly connected to the electric circuit of the circuit board wherein the electric circuit selectively supplies power, which is received via the second terminal, to the drive source via the first terminal;

wherein the lock bar and the drive source form a lock mechanism, and the case defines a compartment for accommodating the circuit board so that the circuit board is not exposed to the lock mechanism and wherein the compartment of the case has an opening opposite to the lock mechanism, with the circuit board being inserted in the compartment through the opening.

11. The steering lock according to claim 10, wherein the housing has an external wall partially covering the opening of the case when the case is housed in the housing.

12. A steering lock for selectively disabling steering by engaging a steering shaft of a vehicle, the steering lock comprising:

a lock bar for disabling rotation of the steering shaft when engaged with the steering shaft;

a drive source for driving the lock bar, the drive source including an input terminal;

a circuit board including an electric circuit for controlling the drive source;

a case for accommodating the circuit board;

a first terminal formed integrally with the case and directly connected to the input terminal of the drive source, wherein the first terminal includes a first end directly connected to the input terminal of the drive source and a second end directly connected to the electric circuit of the circuit board;

a housing defining an accommodation chamber for housing internal components including the lock bar, the drive source, the circuit board and the case, wherein the housing includes an opening through which the internal components are inserted in the accommodation chamber;

a cover for closing the opening wherein the case is attached to and supported by the cover and wherein the drive source is held by the cover and the support surface of the case when the case is attached to the cover; and a second terminal formed integrally with the case and including a first end, electrically connected to a vehicle power supply in which the power supply is located outside the housing, and a second end, directly connected to the electric circuit of the circuit board wherein the electric circuit selectively supplies power, which is received via the second terminal, to the drive source via the first terminal.

* * * * *